US005972406A

United States Patent [19]
Urry et al.

[11] Patent Number: 5,972,406
[45] Date of Patent: Oct. 26, 1999

[54] BIOELASTOMERS SUITABLE AS FOOD PRODUCT ADDITIVES

[75] Inventors: Dan W. Urry, Birmingham, Ala.; Peter R. Shewry, Bristol, United Kingdom; Umamaheswara Prasad Kari, Hatfield, Pa.

[73] Assignees: Bioelastics Research LTD.; The UAB Research Foundation, both of Birmingham, Ala.; University of Bristol, Bristol, United Kingdom

[21] Appl. No.: 08/735,692

[22] Filed: Oct. 16, 1995

Related U.S. Application Data

[63] Continuation of application No. 08/423,517, Apr. 14, 1995, abandoned.

[51] Int. Cl.$^6$ .................................................. A21D 10/00
[52] U.S. Cl. ........................ 426/549; 426/554; 426/555; 426/622
[58] Field of Search ................................ 426/549, 555, 426/554, 72, 622, 548, 656

[56] References Cited

U.S. PATENT DOCUMENTS

| | | | |
|---|---|---|---|
| 3,770,452 | 11/1973 | Finely et al. | 426/190 |
| 4,132,746 | 1/1979 | Urry et al. | |
| 4,187,852 | 2/1980 | Urry et al. | |
| 4,474,851 | 10/1984 | Urry | |
| 4,500,700 | 2/1985 | Urry | |
| 4,589,882 | 5/1986 | Urry | |
| 4,605,413 | 8/1986 | Urry et al. | |
| 4,693,718 | 9/1987 | Urry et al. | |
| 4,783,523 | 11/1988 | Urry et al. | |
| 4,870,055 | 9/1989 | Urry et al. | |
| 4,898,926 | 2/1990 | Urry | 528/328 |
| 4,976,734 | 12/1990 | Urry et al. | |
| 5,032,271 | 7/1991 | Urry | |
| 5,064,430 | 11/1991 | Urry et al. | 623/1 |
| 5,085,055 | 2/1992 | Urry | |
| 5,226,292 | 7/1993 | Urry | |
| 5,250,516 | 10/1993 | Urry | |
| 5,255,518 | 10/1993 | Urry | |
| 5,580,590 | 12/1996 | Hartman | 426/3 |

OTHER PUBLICATIONS

Chakraborty et al. Cereal Chemistry 65(40: 340–344, 1988.
Pritchard, P.E. Aspects of applied biology vol. 36: 75–84, 1993.
Shewry et al. J. Cereal Sci. 15(2): 105–120, 1992.
Tatham et al. Cereal Chemistry 62(5): 405–412, 1985.
Field et al. Biochem. J. 247:215–221, 1987.
Miles PNAS (USA) 88:68–71, 1991.
Roberts et al. The Plant Cell I 569–578, 1989.
Lawrence et al. J. Cereal Sci. 7:109–112, 1988.
Belton et al., (1994) "$^1$H and $^2$H NMR Relaxation Studies of High M$_r$ Subunit of Wheat Glutenin and Comparison with Elastin" *J. of Cereal Science* 19:115–121.
Field et al. (1987) "The Structure of a high–Mr subunit of durum wheat (*Triticum durum*) gluten" *Biochem J.* 247:215–221.

McPherson et al. (1992) "Production and Purification of a Recombinant Elastomeric Polypeptide, G– (VPGVG)$_{19}$ –VPGV, from *Escherichia coli* ". *Biotechnol. Prog.* 8:347–352.
Miles et al. (1991) "Scanning tunneling microscopy of a wheat storage protein reveals details of an unusual super-secondary structure" *Proc. Natl. Acad. Sci. USA* 88:68–71.
Rapaka et al., "Coacervation Properties in Sequential Polypeptide Models of Elastin" (1978) *Int. J. Peptide Protein Res.* 12:81–92.
Shewry et al. (1992) "High Molecular Weight Subunits of Wheat Glutenin" *J. Cereal Sci.* 15:105–120.
Tatham et al. (1984) "Wheat Gluten Elasticity: A Similar Molecular Basis to Elastin?" *FEBS Letters* 177:205–208.
Tatham et al. (1985) "The Beta–Turn Conformation in Wheat Gluten Proteins: Relationship to Gluten Elasticity" *Cereal Chem.* 62:405–412.
Tatham et al. (1990) "Conformation Studies of Synthetic Peptides Corresponding to the Repetitive Regions of the High Molecular Weight (HMW) Glutenin Subunits of Wheat" *J. of Cereal Science* 11:189–200.
Urry et al. (1985) "Carbon–13 NMR Relaxation Studies Demonstrate an Inverse Temperature Transition in the Elastin Polypentapeptide," *Biochemistry* 24:5182–5188.
Urry et al. (1992) "Hydrophobicity Scale for Proteins Based on Inverse Temperature Transitions," *Biopolymers* 32:1243–1250.
Urry (1993) "Molecular Machines: How Motion and Other Functions of Living Organisms Can Result from Reversible Chemical Changes" Angewandte Chemie A *Journal of the Gesellschaft Deutscher Chemiker* 32 (6) :767–922.
Urry, et al., "Design at Nanometric Dimensions To Enhance Hydrophobicity–Induced p$K_a$ Shifts" (1992) *J. Am. Chem. Soc.* 114:8716–8717.

(List continued on next page.)

*Primary Examiner*—Jeffrey Stucker
*Attorney, Agent, or Firm*—Cooley Godward LLP

[57] ABSTRACT

The invention provides a method for improving the texture of a food product by incorporating in the food product or a precursor of the food product a bioelastic polypeptide in an amount sufficient to increase the elasticity of the food product, the bioelastic polypeptide having tetrapeptide or pentapeptide repeating units or mixtures thereof and the repeating units existing in a conformation having a β-turn. The invention also provides a method for binding a food product precursor by adding a bioelastic polypeptide in an amount sufficient to bind the food product precursor, the bioelastomer having tetrapeptide or pentapeptide repeating units or mixtures thereof and the repeating units existing in a conformation having a β-turn. The present invention further provides a food adjunct containing a bioelastic polypeptide having tetrapeptide or pentapeptide repeating units or mixtures thereof where the repeating units exist in a conformation having a β-turn, and an edible material suitable for human or animal consumption.

29 Claims, 4 Drawing Sheets

OTHER PUBLICATIONS

Vasil et al. (1992) "Herbicide Resistant Fertile Transgenic Wheat Plants Obtained by Microprojectile Bombardment of Regenerable Embrygenic Callus" *BioTechnology* 10:667–674.

Urry, et al., "Delineation of Electrostatic– and Hydrophobic–Induced $pK_a$ Shifts in Polypentapeptides: The Glutamic Acid Residue" (1993) *J. Am. Chem. Soc.* 115:7509–7510.

Weeks et al. (1993) Rapid Production of Multiple Independent Lines of Fertile Transgenic Wheat (*Triticum aestivum*) *Plant Physiology* 102:1077–1084.

FIG. 1A 1.    gly val gly val pro (GVGVP)₈ gly val gly val pro
      CGGGATCCA GGC GTT GGT ———————————————— CCA GGC GTT GGATCCCG
      GCCCTAGGT CCG CAA CCA ———————————————— GGT CCG CAA CCTAGGGC
      BamH1    pf1M1                             pf1M1   BamH1

2.    gly val gly val pro (GVGVP)₈ gly val gly val pro
      TT GGT ———————————————— CCA GGC G
      CG CAA CCA ———————————————— GGT C 3.    (gly val gly val pro (GVGVP)₈ gly val gly val pro)ₙ
      TT GGT ———————————————— CCA GGC G
      CG CAA CCA ———————————————— GGT C 4.    met       ((GVGVP)₁₀)ₙ  gly val gly val pro stop
      TCGGATCCAGACC ATG GGC G   TT——GGC G    TT GGT GTA CCG TAAGCTTGAATTCGGATCCAG
      GACCTCGGTCTGG TAC C       CG CAA————C  CG CAA CCA CAT GGC ATTCGAACTTAAGCCTAGGTC
      BamH1    Nco1                          Hind3      EcoR1    BamH1

FIG. 2

```
         P      G      V      G      V      P      G      V
               Pf1M1
cgggat  CCA    GGA    GTT    GGA    GTT    CCT
gcccta  GGT    CCT    CAA    CCT    CAA    GGA
BamH1

GGT    GTA    GGT    GTA    CCT
        CCA    CAT    CCA    CAT    GGA

GGA    GTT    GGT    GTA    CCT
        CCT    CAA    CCA    CAT    GGA

GGT    GTA    GGA    GTT    CCT
        CCA    CAT    CCT    CAA    GGA

GGA    GTT    GGT    GTT    CCA
        CCT    CAA    CCA    CAA    GGT
                             Kpn1

GGT    GTA    GGG    GTA    CCT
        CCA    CAT    CCC    CAT    GGA

GGT    GTT    GGT    GTT    CCT
        CCA    CAA    CCA    CAA    GGA

GGA    GTA    GGA    GTA    CCT
        CCT    CAT    CCT    CAT    GGA

GGT    GTT    GGA    GTA    CCC
        CCA    CAA    CCT    CAT    GGG
Sma1                                        Pf1M1
        GGG    GTA    GGT    GTT    CCA    GGA    GTT    GG  atcccg
        CCC    CAT    CCA    CAA    GGT    CCT    CAA    CC  tagggc
                                                                BamH1
``` pHD203-MK-EPSPS-Tp
8145bp

BIOELASTOMERS SUITABLE AS FOOD PRODUCT ADDITIVES

CROSS REFERENCES

This application is a continuation application of U.S. patent application Ser. No. 08/423,517, filed Apr. 14, 1995, now abandoned.

TECHNICAL FIELD

The present invention relates to materials which are suitable for modifying food texture.

BACKGROUND

Flour prepared from wheat has always had a special place in baking and food preparation. Fine light breads and pastries can be made from wheat flour, but not from ground preparations of other grains (which are often called by a different name, e.g., as in corn meal). Protein elasticity is crucial in determining the functional properties of wheat flours and doughs. The proteins involved are the major storage proteins, such as glutenin, which account for about 10% of the grain dry weight and form a continuous network called gluten when flour is wetted and kneaded to give dough. This network entraps carbon dioxide generated by yeasts during proving of the dough which becomes expanded to form a light porous crumb structure. Leavened bread is therefore, in essence, a protein foam which supports the other flour components, the most important of which is starch.

The ability of the wheat gluten proteins to entrap carbon dioxide to form a foam depends on a combination of two physical properties, namely, elasticity and extensibility. A precise balance of these properties is crucial, as poor quality bread can result when doughs are either insufficiently elastic (weak and too low an elastic modulus) or too elastic (overstrong and too high an elastic modulus). Gluten elasticity is also important for other applications of wheat, including the manufacture of noodles and pasta.

Wheat gluten is a complex mixture of over 50 individual proteins which are classified into two groups present in approximately equal amounts. The gliadins are monomeric proteins which interact by strong non-covalent forces (chiefly, hydrogen bonds and hydrophobic interactions) and contribute to gluten extensibility. In contrast, the glutenins consist of subunits which form high $M_r$ (approx. 1 to $10 \times 10^6$ Da) polymers stabilized by inter-chain disulfide bonds. These polymers appear to be the major determinant of gluten elasticity, although the precise molecular basis for this is not known. However, two features which may be relevant are the number and distribution of disulfide bonds and the presence in one group of glutenin subunits of β-spiral-like structures.

These proteins are called high molecular weight (HMW) subunits of glutenin, and have been studied in some detail because allelic variation in their composition is correlated with differences in the breadmaking quality of wheats (Shewry et al. (1992) *J. Cereal Sci.* 15: 105–120). The individual proteins vary from 627 to 827 residues in length ($M_r$s from about 67,500 to 88,100), and consist of central repetitive domains (481 to 696 residues) flanked by non-repetitive N-terminal (84 to 104 residues) and C-terminal (42 residue) domains. The repetitive domains consist of tandem and interspersed repeats based on nonapeptide (consensus GYYPTSP (SEQ ID NO:1) or LQQ), hexapeptide (PGQGQQ (SEQ ID NO:2) and tripeptide (GQQ) motifs, and appear to form β-spiral structures based on repeated β-turns (Miles et al. (1991) *Proc. Natl. Acad. Sci. USA* 88: 68–71). It has been proposed that these spiral structures are intrinsically elastic (by analogy with elastin) (Tatham et al. (1985) *Cer. Chem.* 62: 405–412; Tatham et al. (1984) *FEBS Lett.* 177: 205–208), although the mechanism is clearly different (Belton et al. (1994) *J. Cereal Sci.* 19: 115–121). The non-repetitive N- and C-terminal domains appear to be globular and form cross-links via disulfide bonds.

Elastin is comprised of a single protein containing a serial alignment of alanine-rich, lysine-containing cross-linking sequences alternating with glycine-rich hydrophobic sequences. With the entire bovine sequence known, the most striking hydrophobic sequences, both from the standpoint of length and of composition, are one that contains a polypentapeptide (PPP) and one that contains a polyhexapeptide (PHP). Elastin also contains several tetrapeptide (TP) units. As a result of work conducted by one of the present inventors, the polypentapeptide of elastin when cross-linked has been found to be elastomeric and the polyhexapeptide thereof has been found to be non-elastomeric and appears to provide a means for aligning and interlocking the chains during elastogenesis. It has also been found that the elastin polypentapeptide and polytetrapeptide are both conformation-based elastomers that develop entropic elasticity and strength on undergoing an inverse temperature transition to form a regular β-turn containing dynamic structure.

Most importantly, cross-linked PPP, PTP and analogs thereof at fixed length exhibit elastomeric force development at different temperatures spanning a range of up to about 75° C. depending upon several controllable variables. Moreover, these cross-linked elastomers develop near maximum elastomeric force over a relatively narrow temperature range. Thus, by synthesizing bioelastomeric materials having varying molar amounts of the constituent pentamers and tetramers together with such units modified by hexameric repeating units, and by choosing a particular solvent to support the initial viscoelastic phase, it is possible to rigorously control the temperature at which the obtained bioelastomer develops elastomeric force.

In general, the process of raising the temperature to form the above elastomeric state is an inverse temperature transition resulting in the development of a regular non-random structure, unlike typical rubbers, which utilizes, as a characteristic component, hydrophobic intramolecular interactions. The regular structure is proposed to be a β-spiral, a loose water-containing helical structure with β-turns as spacers between turns of the helix which provide hydrophobic contacts between helical turns and has suspended peptide segments between β-turns. The elastomeric force of these various bioelastomers develops as the regular structure thereof develops. Further, a loss of regular structure by high temperature denaturation results in loss of elastomeric force. These polymers can be prepared with widely different water compositions, with a wide range of hydrophobicities, with almost any desired shape and porosity, and with a variable degree of cross-linking by selecting different amino acids for the different positions of the monomeric units and by varying the cross-linking process, e.g. chemical, photochemical, enzymatic, irradiative, used to form the final product.

These bioelastomeric polypeptides are a relatively new development that arose in the laboratories of one of the present inventors and are disclosed in a series of previously filed patents and patent applications. For example, U.S. Pat. No. 4,474,851 describes a number of tetrapeptide and pentapeptide repeating units that can be used to form a bioelastic polymer. Specific bioelastic polymers are also described in U.S. Pat. Nos. 4,132,746, 4,187,852, 4,589,882, and 4,870,055. U.S. Pat. No. 5,064,430 describes polynonapeptide bioelastomers. Bioelastic polymers are also disclosed in related patents directed to polymers containing peptide repeating units that are prepared for other purposes but which can also contain bioelastic segments in the final polymer: U.S. Pat. Nos. 4,605,413, 4,976,734, and 4,693,718,; 4,898,926, entitled "Bioelastomer Containing Tetra/Pentapeptide Units"; 4,783,523 entitled "Temperature Correlated Force and Structure Development of Elastin Polytetrapeptide"; 5,032,271, 5,085,055, and 5,255,518, entitled "Reversible Mechanochemical Engines Comprised of Bioelastomers Capable of Modulable Temperature Transitions for the Interconversion of Chemical and Mechanical Work"; 4,500,700, entitled "Elastomeric Composite Material Comprising a Polypeptide"; and 5,250,516. A number of other bioelastic materials and methods for their use are described in pending U.S. patent applications including: U.S. Ser. No. 184,873, filed Apr. 22, 1988 (now issued as U.S. Pat. No. 5,336,256); U.S. Ser. No. 07/962,608, filed Oct. 16, 1992; U.S. Ser. No. 08/187,441, filed Jan. 24, 1994; and U.S. Ser. No. 08/246,874, filed May 20, 1994 (now issued as U.S., Pat. No. 5,527,610), entitled "Elastomeric Polytetrapeptide Matrices Suitable for Preventing Adhesion of Biological Materials." All of these patents and patent applications are herein incorporated by reference, as they describe in detail bioelastomers and/or components thereof and their preparation. This information can be used in preparing and using the compositions and methods of the present invention.

While varieties of wheats have been selected for properties favorable for processing into foods, the proteins of grains are principally storage proteins held in readiness for germination; they were not selected in evolution for properties of elasticity, extensibility, etc. which would be optimal for production of breads, noodles, pastries, etc. The recent development of routine procedures for transformation of wheat (Vasil et al. (1992) Bio/Technology 10: 667–675; Weeks et al. (1993) Plant Physiology 102: 1077–1084) allows for the manipulation of wheat proteins by genetic engineering. There remains a need to improve the quality of flour doughs, especially flours produced from other, less conventional, more economically viable grains such as corn, oats, rye and millet, to improve the texture of breads, pastries and other condiments made from these agricultural products.

Relevant Literature

Belton, P.S., et al., (1994) $^1$H and $^2$H NMR relaxation studies indicate that the elasticity of the HMW subunits of glutenin is not elastin-like. *J. Cereal Sci.* 19: 115–121.

Miles, M. J., et al., (1991) Scanning tunnelling microscopy of a wheat gluten protein reveals details of a spiral supersecondary structure. *Proc. Natl. Acad. Sci.* (USA) 88: 68–71.

Moonen, J. E., et al., (1982) Use of the SDS-sedimentation test and SDS-polyacrylamide gel electrophoresis for screening breeder's samples of wheat for breadmaking quality. *Euphytica* 31: 677–690.

Payne, P. I. (1987) Genetics of wheat storage proteins and the effect of allelic variation on bread-making quality. *Plant Physiol.* 38: 141–153.

Payne, P. I., et al., (1981) Correlations between the inheritance of certain high-molecular weight subunits of glutenin and bread-making quality in progenies of six crosses of bread wheat. *J. Sci. Food Agric.* 32: 51–60.

Pomeranz, Y and Williams, P. C. (1990) Advances in Cereal Science and Technology, 10: 492–501, Eds Pomeranz, Y., American Association of Cereal Chemists Inc., St. Paul, Minn.

Shewry, P. R., et al., (1992) The high molecular weight subunits of wheat glutenin. (Critical Review Article) *J. Cereal Sci.* 15: 105–120.

Tatham, A. S., et al., (1985) The β-turn conformation in wheat gluten proteins: relationship to gluten elasticity. *Cer. Chem.* 62: 405–412.

Tatham, A. S., et al., (1984) Wheat gluten elasticity: a similar molecular basis to elastin? *FEBS Lett.* 177: 205–208.

Vasil, V., et al., (1992) Herbicide resistant fertile transgenic wheat plants obtained by microprojectile bombardment of regenerable embryogenic callus. *Bio/Technology* 10: 667–675.

Weeks, J. T., et al., (1993) Rapid production of multiple independent lines of fertile transgenic wheat. *Plant Physiology* 102: 1077–1084.

SUMMARY OF THE INVENTION

The invention provides a method for improving the texture of a food product by incorporating a bioelastic polymer into a food product or a precursor of the food product in an amount sufficient to increase the elasticity of the food product.

The invention provides a method for binding a food product precursor by adding a bioelastic polymer to the food product precursor in an amount sufficient to bind the food product precursor.

The present invention also provides a composition consisting of a bioelastic polymer comprising tetrapeptide or pentapeptide repeating units or mixtures thereof and an edible material suitable for human or animal consumption. The compositions have considerable potential for use in the food industry as they can be modified in structure to provide a number of different properties and are available in different physical forms, such as sheets, gels, foams, or powders.

BRIEF DESCRIPTION OF THE DRAWINGS

The invention will be better understood by reference to the following detailed description of specific embodiments with the figures that form part of this specification, wherein.

A. 1. The synthetic gene for (GVGVP)$_{10}$ (SEQ ID NO:3) with flanking external BamHl and internal PflM1 restriction endonuclease recognition sites (SEQ ID NO:4 and 3). The gene and plasmid pUC118 were each cleaved with BamHl and mixed together with ligase, to recircularize the plasmid with the gene inserted. The plasmid with the cloned gene was amplified in *E. coli*. 2. A large-scale plasmid preparation was cleaved with PflM1 and the released (GVGVP)$_{10}$ fragment was purified. 3. The purified PflM1 fragment was self-ligated to form the concatemer genes. 4. Addition of adaptor oligonucleotides to the ligation reaction provides terminal sequences (SEQ ID NO:6 and 7) containing restriction sites needed for cloning the (GVGVP)$_n$ genes into various expression plasmids. Although the genes are referred to in multiples of 10, the adaptor oligonucleotides provide an additional pentamer sequence resulting in [(10)$_n$]+1.

B. Schematic illustration of events described in A.

FIG. 2 depicts the sequence of the (GVGVP)$_{10}$ gene for tobacco(SEQ ID NO:8).

Figure 3:
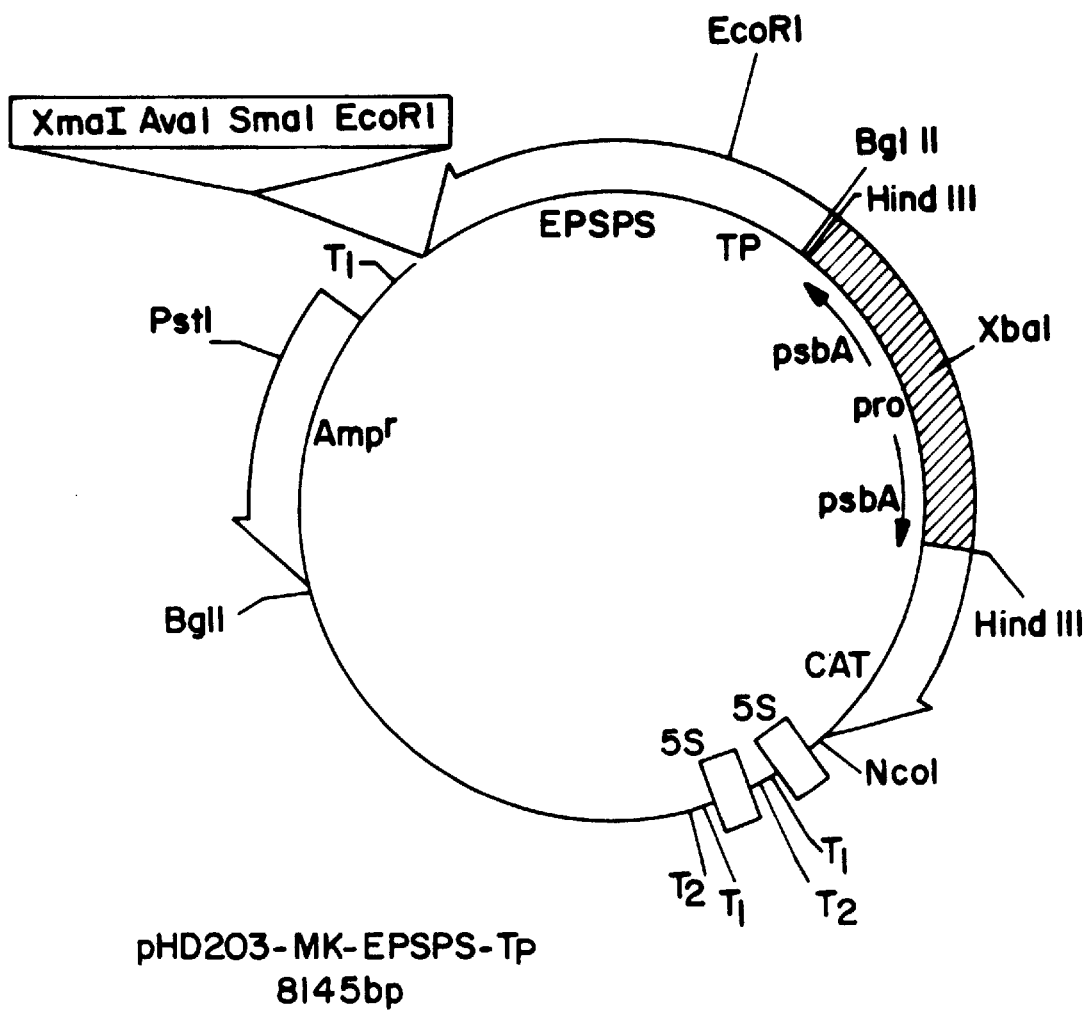

FIG. 3 is a schematic diagram of the plasmid pHD203-GUS-EPSPS (EN/polyA).

DETAILED DESCRIPTION OF THE INVENTION

The introduction of an elastic, protein-based polymer into a food product or a food product precursor can be exploited to provide desired properties of texture and consistency or to supplant and replace undesired properties of fats, calories, etc. of the food product. Elastic protein-based polymers are not only edible, but can also be produced having a number of different physical forms. For example, they can be expressed from aerosol cans as foams with the potential for being a substitute for whipped creams or used to produce meringue. As gels, foams, malleable material e.g. gums, sheets and viscoelastic bases, they can be doped with flavors, just as they can be doped with drugs (see United States patent application Ser. No. 07/962,608, filed Oct. 16, 1992, which is incorporated herein by reference), such that they can be used, for example, in pastry layers and coatings. The adhesive properties of elastic protein-based polymers can be exploited so that the polymers act as binders, holding together other processed agricultural products.

Now that the possibilities for use of these elastic protein-based polymers in food has been realized, expansion to a myriad of applications requires little imagination. With this invention comes an environmental friendliness in production and disposal, and a nutritional aspect of being protein instead of fat. Moreover, the sufficiently low cost of bio-production of elastic protein-based polymers, especially when used in combination with more economically viable crops which would otherwise result in products having less desirable properties, provides a cheap resource for consumable commodities.

Bioelastic polypeptides have been previously characterized and described in a number of patents and patent applications described above. These materials contain either tetrapeptide, pentapeptide, or nonapeptide monomers which individually act as elastomeric units within the total polypeptide containing the monomeric units. The elasticity of the monomeric units is believed to be due to a series of β-turns in the protein's secondary structure, i.e., the conformation of its peptide chain, separated by dynamic (as opposed to rigid) bridging segments suspended between the β-turns. A β-turn is characterized by a 10-atom hydrogen-bonded ring of the following formula:

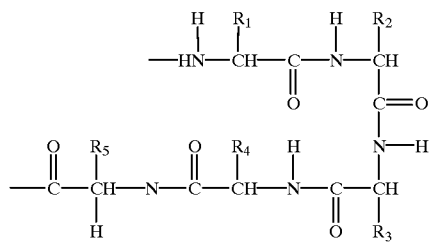

In this formula $R_1$–$R_5$ represent the side groups of the respective amino acid residues. The 10-atom ring consists of the carbonyl oxygen of the first amino acid, the amino hydrogen of the fourth amino acid, and the intervening backbone atoms of amino acids two and three. In this monomeric unit as shown, the remaining backbone atoms of the chain (the remainder of amino acid four, amino acid five, and the first part of amino acid one of the next pentameric unit) form the bridging segment that is suspended between adjacent β-turns. Similar structures are present in elastomeric peptide units of other lengths. Other peptide structures, such as β-barrels, can also impart elasticity to bioelastic polymers. Bioelasticity is imparted by structures that impart internal dampening of chain dynamics upon polymer extension, i.e. oscillation or freedom to rotate about torsional angles or bonds is dampened. The dampening results in reducing the degrees of freedom available in the extended state.

This β-turn-containing structure is described in the prior patents and patent applications cited above and need not be described again in detail. Considerable variations in the amino acids that are present at various locations in the repeating units is possible as long as the multiple β-turns with intervening suspended bridging segments are retained in order to preserve elasticity. There appears to be no upper limit to the molecular weight of polymers used in the invention except that imposed by the processes of making these polymers. Polymers containing up to about 250 pentamers have been synthesized from *E. coli* using recombinant DNA methods. Typical polymers contain at least 5, preferably at least 10, more preferably at least 20, tetrapeptide or pentapeptide monomers, and because of increasing viscosity in aqueous solvents, usually contain fewer than 1000, usually fewer than 500, of such units for expressing foams from aerosol cans but may be of any length for use in dough making with the greatest length obtainable being preferred. Furthermore, it is possible to prepare polypeptides in which these monomeric units are interspersed throughout a larger polypeptide that contains peptide segments designed for other purposes. For example, rigid segments can be included to increase the modulus of elasticity or to achieve special alignment and for cross-linking. In order to improve digestibility of the polymer, protease cleavage sites can be introduced into the polymer such as lysine or arginine residues for tryptic digest or pepsin sites. The invention can also use polymers having bioelastic units interspersed between segments of other molecules, such as proteins or peptides, lipid, carbohydrates, or other organic compounds.

The upper limit on the number and kind of substituents that may be linked to the polymer is influenced by the ability of the elastic polymer to fold/assemble properly to attain beta-spiral elements of structure in the relaxed state. The location of the substituents in the polymer, with respect to the monomer residue side-chain position, is not critical so long as the beta-turn is not prevented from forming in the relaxed state. Preferred positions for the various peptides are as taught in the patents and pending applications from the laboratory of the present inventor in this area, which have been incorporated by reference.

These bioelastomeric materials, which include the prototypic poly(Val$^1$-Pro$^2$-Gly$^3$-Val$^4$-Gly$^5$) (referred to herein as "poly(VPGVG) (SEQ ID NO:2)") and poly(Val$^1$-Pro$^2$-Gly$^3$-Gly$^4$) (SEQ ID NO: 9) molecules as well as numerous analogues, when combined with water form viscoelastic phases which when cross-linked result in soft, compliant, elastomeric matrices. Cross-linking of a pulymer solution to form an elastic matrix can be performed using various cross-linking process, e.g. chemical, enzymatic, irradiative. U.S. Pat. No. 4,589,882, incorporated herein by reference, teaches enzymatic cross-linking by synthesizing block polymers having enzymatically cross-linkable units. The teachings of this patent can be applied to recombinant bioelastic polypeptides. Recombinant techniques are used to generate a vector that encodes a bioelastic polypeptide having the required ratios of lysine and glutamate residues as described for the synthetic polymer in U.S. Pat. No. 4,589,882. In this case, the enzymatic cross-linking procedure progresses in vivo by the action of lysyl oxidase, a primarily extracellular enzyme. Alternatively, cross-linking in vivo can occur via disulfide bridges in a manner similar to how linkages are thought to occur with glutenin, The bioelastic polypeptide is engineered in this case to contain cysteine residues which can form interchain disulfide linkages to each other.

In general, selection of the sequence of amino acids in a particular monomeric unit and selection of the required proportion of monomeric units can be accomplished by an empirical process that begins with determining (or looking up) the properties of known bioelastomers, making similar but different bioelastomers, and measuring the transition temperature (T) as described in the cited patents and patent applications. Preferably, however, one uses tables of relative hydrophobicity of amino acid residues (either naturally occurring or modified) to compute the transition temperature without experimentation. For example, see Y. Nozaki and C. Tanford, *J. Biol. Chem.* (1971) 246: 2211–2217, or H. B. Bull and K. Breese, *Archives Biochem. Biophys.* (1974) 161: 665–670, and D. Urry (1993), *Angewandte Chemie* Omt. Ed. Engl. 32: 819 for particularly useful compilations of hydrophobicity data. For example, a rough estimate can be obtained of the likely transition temperature by summing the mean hydrophobicities of the individual amino acid residues in the monomeric units of the polymer pod comparing the result to the sum obtained for polymers having known transition temperatures or by directly summing transition temperatures from the $T_t$-based hydrophobicity scale (see Table 1 of U.S. Ser. No. 08/187,441, filed Jan. 24, 1994) and dividing to obtain a mean value.

More accurate values can be calculated for any given polymer by measuring transition temperatures for a series of related polymers in which only one component is varied. For example, polymers that mostly contain VPGVG monomers (SEQ ID NO:20) with varying amounts of VPGXG monomers (SEQ ID NO:10) (e.g., 2%, 4%, and 8% X, where X is any chosen amino acid residue) can be prepared and tested for transition temperatures. The test merely consists of preparing the polymer in uncrosslinked form, dissolving the polymer in water, and raising the temperature of the solution until turbidity appears, which indicates the precipitation of polymer from solution. If the transition temperatures are plotted versus the fraction of VPGXG monomer (SEQ ID NO:10) in the polymer, a straight line is obtained, and the fraction of VPGXG (SEQ ID NO:10) necessary for any other desired temperature (within the limits indicated by 0% to 100% of the VPGXG monomer (SEQ ID NO:10)) can be obtained directly from the graph. When this technique is combined with the rough estimating ability of hydrophobicity summing as described above, any desired transition temperature in the range of liquid water can be obtained. It should be understood that the position of 'X' is chosen solely as an example in the discussion above; X can be at any position in the repeating unit and occur at more than one position as long as the overall properties of the bioelastomer remain. The choice of individual amino acids from which to synthesize the elastomeric units and resulting polypeptide is unrestricted so long as the resulting structure comprises elastomeric structures with features described, for example, in U.S. Pat. Nos. 4,474,851 and 5,064,430, particularly β-turn formation. In this way, the amino acid sequences of the elastomeric units are chosen to provide the desired properties in the resulting food product.

Synthesis of the bioelastomeric repeating units is straightforward and easily accomplished by peptide chemistry. Synthetic bioelastomers can be produced and cross-linked by methods described in the patents and patent applications of the present inventor, in which case the bioelastomeric polypeptide is added to the food precursor during the manufacture of the food product. The bioelastomeric polypeptide will be added in an amount sufficient to increase the elasticity of the food product. Usually from 1% to 99.5% by weight will be added depending on the application with about 10% for making doughs and approaching 100% for whipping cream.

An alternative to the organic synthesis of protein-based polymers is a biosynthetic approach using current recombinant DNA methodologies. Using this approach, a gene encoding the desired peptide sequence is constructed, and artificially inserted into a host organism, which then produces the peptides. The host can be prokaryotic, e.g. bacteria, or eukaryotic, e.g. yeast, plant. Recombinant DNA can be used to create synthetic genes encoding multiple repeating units of a given peptide sequence, and these synthetic genes can themselves be polymerized to create even longer coding sequences, resulting in protein-based polymers of greater length. Molecular biology techniques known in the art are used to manipulate the genetic information (i.e., DNA sequences) for their effective expression in the appropriate host organism (see, for example, Sambrook et al., Molecular Cloning: A Laboratory Manual, Second Edition, Cold Spring Harbor, N.Y. (1989); Deguchi et al., (1993) Mat. Res. Soc. Symp. Proc., 292: 205–210; Capello, J. (1992) in Review Protein Engineering Biomaterial, Curr. Opin. Struct. Biol., 2: 582–586; McPherson et al. (1992); Perbal, B. (1988) In A Practical Guide to Molecular Cloning, 2nd Ed., John Wiley & Sons NY; Ausubel, F. M. (1989) In Current Protocols in Molecular Biology, Vols 1 & 2, John Wiley & Sons NY). The primary tools that make this possible are known in the art and include enzymes capable of cleaving, joining, copying and otherwise modifying polynucleotides. In addition, vectors allowing the introduction of this information into the host organism in a suitable manner for expression are also known in the art. When the host is microbial, the resulting protein can be purified in large amounts from cultures grown in fermentation reactors and can be added to the food product precursor in a manner similar to synthetically produced bioelastomer. A detailed example of the production of poly-VPGVG (SEQ ID NO:20) is set out in McPherson et al., "Production and Purification of a Recombinant Elastomeric Polypeptide, G-(VPGVG)$_{19}$-VPGV (SEQ ID NO:21), from Escherichia coli," Biotechnol. Prog., 1992: 347–352, a publication arising from the laboratory of one of the present inventors and in U.S. patent application entitled "Hyperexpression of Bioelastic Polypeptides" and in U.S. application entitled "A Simple Method for the Purification of Bioelastic Polymers", both filed on even date herewith. These can be used as guidance for genetic-based production and purification of the material of the present invention and are herein incorporated by reference.

Certain crop plants are transformable by techniques that include plasmid-mediated insertion of DNA into chromosomes and by more random bombardment of plant cell lines with micro projectiles coated with DNA. The latter procedure has been used to transform the chloroplast as well as the nuclear genome. Multiple copies of the chloroplast genome exist in each plant cell, making it advantageous to target the chloroplast for gene amplification and protein overproduction. Plant-produced foreign proteins can involve production of stored or intracellular proteins, but more recent studies have employed leader sequences appropriate for excretion of transgenic protein.

The resulting polypeptide can be isolated by techniques known in the art (for example, Scopes, R. K. (1987) in Protein Purification, Springer Verlag, N.Y.; McPherson et al.

(1992)) and used as described above for microbially expressed protein. Alternatively, the polypeptide can be expressed in a host selected for processing into the food product, e.g. wheat, corn, oats, rye, millet, and beans. Methods for transforming plants are known in the art (Shimamoto, K., et al. (1989) Nature 338: 274–277; Datta, S. K., et al. (1990) Bio/Technology 8: 736–740; Cristov, P., et al. (1991) Bio/Technology 9: 957–962; Gordon-Kamm, W. J., et al. (1990) The Plant Cell 2: 603–618; Fromm, M. E., et al. (1990) Bio/Technology 8: 833–839; Vasil, V., et al. (1992) Bio/Technology 10: 667–674; Weeks, J. T., et al. (1993) Plant Physiol. 102: 1077–1084; Somers, D. A., et al. (1992) Bio/Technology 10: 1589–1594; Bower, R. and Birch, R. G. (1992) Plant J. 2: 409–416; Kung, S. and Wu, R. (1993) Transgenic Plants Engineering and Utilization 1: 382; Daniell, H. (1993) Methods in Enzymol. 217: 536–556).

For bioproduction of artificial protein-based polymers, such as the elastomeric poly(VPGVG) (SEQ ID NO:20) (equivalently written as poly(GVGVP) (SEQ ID NO:3), poly(GVPGV) (SEQ ID NO:22) or other permutations), whether carried out in bacteria or plants, it is advantageous that: (i) a gene be synthesized with many tandem copies of the peptide coding unit, using codons appropriate for the codon preferences of the selected expression hosts, (ii) the synthetic gene should be easy to clone into a vector plasmid and transferable as a cassette to alternative expression vectors; (iii) the synthetic gene be expressed into the desired polypeptide product using transcription and translation control signals appropriate for the expression host; and preferably (iv) the polypeptide be expressed in a way that allows purification; and (v) amino acids extraneous to the VPGVG repeating sequence (SEQ ID NO:20) be avoided or removed after expression.

Briefly, a gene coding for ten repeating units of an elastomeric peptide, for example, is constructed using synthetic oligonucleotides and cloned into an expression vector. The gene for the bioelastomeric polypeptide can be further expanded to certain additional repeating units by use of additional oligonucleotides and PCR (U.S. Pat No.: 4,683, 202, for example) to duplicate the 10-mer gene. This technique relies on the presence of suitable restriction enzyme recognition sites at the 3' end of the unit gene, in this case the 10-mer, to insert each tandem addition of the unit. This modular approach can be used to build successive genes, each increasing in size by one additional unit. One of the inherent problems in constructing genes with multiple repeat copies is the potential for recombination and deletion in *E. coli*. The method of gene construction with repetitive sequences when used in the appropriate host strain (e.g., recA$^-$) is not problematic for poly(GVPVG) (SEQ ID NO:23).

Alternatively, "concatemeric" routes are possible for the construction of higher molecular weight polymeric proteins. One involves the use of double-stranded oligonucleotide monomers, each coding for a bioelastomeric peptide unit, which are ligated through cohesive ends to form a multimeric sequence (concatemer) encoding the polypeptide. Another route is to combine the modular approach with the concatemeric route in that a gene encoding multiple repeats (e.g., 10-mer) of the peptide unit is constructed having terminal restriction enzyme sites that leave, upon cleavage, non-palindromic cohesive ends; these gene monomers can be ligated to create multimers encoding high molecular weight polymers. These alternative methods allow construction of high molecular weight genes with greater ease and rapidity than the modular cloning approach.

In its broadest aspect, the present invention provides a food adjunct and a method for improving the texture of a food product by incorporating a bioelastic polypeptide into the food product or its precursor in an amount sufficient to increase the elasticity of the food product. The invention also provides a method for binding a food product by adding a bioelastic polypeptide to a food product precursor in an amount sufficient to bind the food product precursor.

A food adjunct as used herein describes bioelastic polypeptides that can be formed in different physical forms and employed in conjunction with food products or their precursors, with the optional inclusion of an edible material suitable for human or animal consumption, for example, synthetic or natural flavors, e.g. peppermint, lemon, or vanilla essences and sweeteners, e.g., saccharin, aspartame or sugar.

Food texture is improved by the method of the present invention by increasing the elasticity and extensibility of the food product or its precursor. For example, the quality of a flour in dough-making is dependent on its extensibility and elasticity when mixed with water to form a dough, properties that are primarily conferred by its proteins. These qualities have generally been measured by determining bread-making quality, e.g. determining the SDS-sedimentation volumes as an indirect measurement of bread-making quality (Moonen et al., (1982) *Euphytica* 31: 677–690). Standard baking tests and micro-baking tests are carried out as described, for example, by Smak, C. (1972) *Cer. Chem.* 49: 554–560 or Meppelink (1981) Getreide, Mehl und Brot 35: 107–109. Alternatively, the viscoelasticity of the dough can be measured directly.

The improved dough elasticity in turn results in improved food product texture, for example, making the food product less prone to crumbling or disintegration. This is particularly pertinent to flours which generally cannot now be processed into high quality doughs, e.g., those from maize, corn and oats.

In this case, the bioelastomers can be either added directly to the flour or expressed by a transgenic plant in order to introduce these specific properties to the flour resulting from the crop, i.e. elasticity and extensibility. The intrinsically elastic subunits based on the VPGVG pentapeptide motif (SEQ ID NO:20) or a combination of VPGVG (SEQ ID NO:20), IPGVG (SEQ ID NO:11) and VPAVG, (SEQ ID NO:12) for example, can result in a preferred elastic modulus. It is only important that repeating units are chosen so that baking occurs at a temperature greater than Tt for the polymer. Incorporation of such subunits into naturally occurring proteins, e.g. gluten, for example, via interchain disulfide bonds would also result in increased optimal elasticity and improved quality for bread-making and other applications.

Furthermore, polyhexapeptide units can be incorporated into the bioelastomer to provide an assembly of an elastic superstructure, e.g., (pentapeptide)$_n$(hexapeptide)$_n$ (pentapeptide)$_n$. For example, (GVGVP)$_n$(GVGIP)$_n$ (GFGVGP)$_n$(SEQ ID NO:24 and 13) provides a soft polymer that can be used as a chewing gum base. The ratio of repeating units will often depend on the flavoring used which can soften gums further. However, the ratios are easily determined by one of ordinary skill in the art in light of the teachings of the present application.

The bioelastomers can also be engineered according to the teachings of the present inventor's patent applications and patents to have adhering properties. These properties can be exploited to bind food product precursors, in which case from about 1% to 99.5% by weight of the bioelastomer is to the food product precursor, preferably from about 10% to 90%, preferably from about 30% to 70%.

EXAMPLES

Example 1:
Expression of Gene Constructs Encoding a Bioelastic Polymer

Figure 1B:
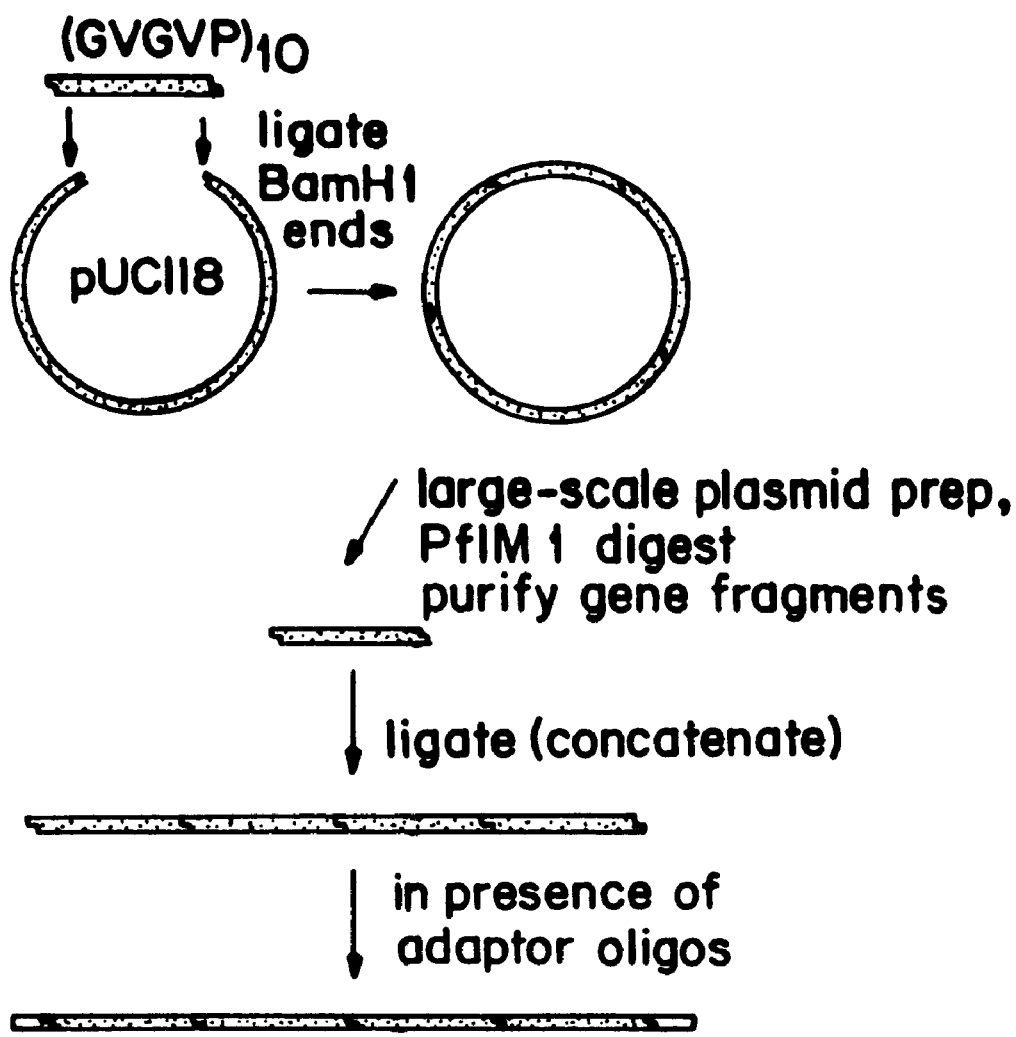
FIG. 1 is a schematic illustration of the cloning steps of (GVGVP)$_n$ genes.

The (GVGVP)$_{120}$ was constructed using synthetic oligonucleotides having the sequence depicted in FIG. 1. The oligonucleotides were flanked with sequences containing the BamH 1 (G'GATCC) (SEQ ID NO:25) and P*f*lM1 (CCAGGCGTTGG) (SEQ ID NO:14) restriction endonuclease recognition sites. This nucleic acid was inserted into the plasmid pUC118 and used to transform *E. coli*. After isolating the amplified plasmid, the sequence of the gene insert was verified by DNA sequence analysis (Sambrook et al., Molecular Cloning: A Laboratory Manual, Second Edition, Cold Spring Harbor, N.Y. (1989)).

This 10 mer gene was then used as a modular unit for constructing longer genes encoding (GVGVP)$_n$ (SEQ ID NO:3) of higher molecular weights. Plasmid containing the 10 mer gene was prepared and digested with P*f*lM1. The P*f*lM 1 (GVGVP)$_{10}$ (SEQ ID NO:26) gene fragments were then purified and used in subsequent ligation reactions to form polymers of [(GVGVP)$_{10}$]$_n$ (SEQ ID NO:26). Also, separate adaptor oligonucleotides with unique restriction sites were added to this ligation reaction to allow the subsequent cloning of the concatenated gene fragments. These adaptor oligonucleotides were added at a ratio that would favor the recovery of high molecular weight "concatemers". This process is represented schematically in FIG 1B.

For recovery and cloning of individual length concatemer genes, the ligation mixture was digested with BamHl then electrophoresed through an agarose slab gel to achieve separation of the various molecular weight sizes. Slices corresponding to different size ranges then were removed from the gel, the DNA was recovered, and then cloned into plasmid pUC118 (Urry et al. "Elastic and Protein-based Polymers: Potential for Industrial Uses, (Am. Chem. Soc.) Div. Polym. Mat.: Sci & Engr., "Industrial Biotechnological Poiymers," Washington D.C., 1994). Gene inserts into this plasmid were analyzed by restriction endonuclease digestion and accurately sized by agarose gel electrophoresis adjacent to a concatemer "ladder". To achieve expression of a native protein-based polymer in *E. coli*, a concatemer gene encoding (GVGVP)$_{120}$ (SEQ ID NO:20) was subcloned from pUC118 into the expression vector pQE-32 (Quiagen, Inc.) as a gene fusion behind a sequence encoding six tandem histidines. Expression using this plasmid resulted in the production of proteins with an amino-terminal polyhistidine fusion, specifically, MRGSH$_6$GIQTM-(GVGVP)$_n$ (SEQ ID NO:15). This fusion moiety provides the ability to affinity purify the protein by metal-chelate chromatography. Several different sized concatemer genes were subcloned into and expressed from the pQE-32 vector in *E. coli*. The poly (GVGVP) polymers (SEQ ID NO:3) that were produced were affinity purified from the bacterial cells and shown to have the requisite glycine, valine and proline at the expected ratios for poly(GVGVP) (SEQ ID NO:3) by amino acid analysis of phenylisothiocyanate (PITC) derivatives of the amino acids separated by reverse phase liquid chromatography. This established that genes encoding protein-based polymers of high molecular weight, for example, (GVGVP)$_{250}$ (SEQ ID NO:28), can be made and efficiently expressed in an *E. coli* host organism; using a gene fusion and affinity purification approach it was also possible to highly purify the recombinant protein and show that it was the desired product.

Purification of Expressed Product

Using affinity purified MRGSH$_6$GIQTM-(GVGVP)$_{120}$ (SEQ ID NO:20), it was shown that the protein-based polymer reversibly precipitates (i.e., coacervates) by raising and lowering the temperature; this coming out and into solution could be determined visually by watching the liquid go cloudy and then clear.

This property was used to purify histidine fusion proteins comprising (GVGVP)$_n$ (SEQ ID NO:3) where n=40, 140 and 250. First, a chilled (on ice) suspension of *E. coli* cells containing the protein-based polymer was lysed by sonic disruption to disperse the cellular components. At cooler temperatures, the poly(GVGVP) (SEQ ID NO:3) remains in the unfolded soluble state and the insoluble cell debris can be removed by centrifugation. While still cold, the lysate was centrifuged at high speed to remove the insoluble cell debris. The recovered supernatant was then warmed to 37° C. causing the protein-based polymers to form a visible aggregate, at which point it was removed from the soluble fraction by centrifugation. Upon heating to above its transition temperatures of 37° C., the poly(GVGVP) (SEQ ID NO:3) species forms a new phase which allows for selective removal by centrifugation from the remaining solute. Repeating this procedure once again, as a wash, resulted in product that was as pure as the affinity purified material when analyzed by SDS-polyacrylamide gel electrophoresis. In this way, over 90% bacterial endotoxin was removed.

Example 2
Expression and Purification of Native Poly (GVGVP)$_{120}$ (SEQ ID NO:27) in *E. coli*

To achieve expression of a native protein-based polymer in *E. coli*, a concatemer gene encoding (GVGVP)$_{120}$ (SEQ ID NO:27) was subcloned from pUC118 described in Example 1 into the expression vector pET-11d (Novagen, Inc.) as a Ncol to BamH 1 fragment. The protein was expressed at high levels from this plasmid without the amino-terminal affinity moiety previously described. It was also effectively purified as described in Example 1 using the temperature induced aggregation procedure.

Example 3
Expression of Elastic Protein-Based Polymer, Poly (GVGVP) (SEQ ID NO:3) in Tobacco Chloroplasts Genes encoding the poly(GVGVP) protein (SEQ ID NO:3) in the range of 150 tandem pentapeptide units are constructed for expression in tobacco systems using synthetic oligonucleotides and PCR, to encode 10 repeating units of the GVGVP(SEQ ID NO:3). FIG. 2 shows the sequence of the gene, comprising optimal codons for tobacco while maintaining maximal coding degeneracy. The gene is constructed using two oligonucleotides, each representing just over half of the gene. The oligonucleotides have complementary 25 base overlaps (dotted underline in figure) at their 3' ends that are extended by the PCR reactions to form the full-length double-stranded sequence. The PCR product is digested with BamHl and inserted into plasmid pUC119 for sequence confirmation and continued maintenance. The fragment is excised from pUC 119 using P*f*lM1 and self-ligated to form concatemers, with the inclusion of adaptor fragments to terminate multimerization in the desired size range.

The synthetic gene is introduced into chloroplasts of cultured tobacco cells using the Gene Gun, essentially as described by Danieli (Methods Enzymol. 217 (1993) 536–556). After continued growth of transformed cells in MS salt medium in the presence of $^{35}$S methionine, chloroplasts are isolated using a Mini-bead beater (Daniell et al.

(1993) Nucleic Acids Res. 21: 1503-1504). Soluble chloroplast proteins are obtained by rupturing chloroplasts in hypotonic buffer. The bioelastomer is purified essentially as described in Example 1.

Example 4

Expression of Plastic Protein-Based Polymer. Poly(AVGVP) (SEQ ID NO:30). from Tobacco For construction of the gene encoding poly(AVGVP) (SEQ ID NO:30) in the range of 150 repeating units for expression in tobacco, a different concatemeric approach is used. Specifically, two 15 base degenerate oligonucleotides, 5' CCNGCNGTNGGNGTN 3' (SEQ ID NO:16) and 5' CNGGNACNCCNACNG 3', are synthesized ( where N=G, A,T or C), each representing one strand of a double-stranded unit encoding the (AVGVP) (SEQ ID NO:30) monomer (SEQ ID NO:12), with codon choice for tobacco. The two strands are offset such that they anneal leaving 4–5 base overlapping ends that are complementary, allowing joining of the 5' ends to the 3' ends. The annealed oligonucleotides, or catemers, are ligated through their complementary ends to form long multimers, or concatemers, as described above for the (GVGVP)$_{10}$ (SEQ ID NO:26) genes. Expression and purification of the bioelastomeric polypeptides are essentially as described above, with the exception that the transition temperature for poly (AVGVP) (SEQ ID NO:30) is used.

Example 5

Expression of poly(VPGVG) After Stable Chloroplast or Nuclear Transformation

The plasmid pHD203-GUS-EPSPS (EN/polyA) (see FIG. 3) contains CaMV 35S promoter/enhancer elements driving the aroA gene (coding for EPSP synthase conferring resistance to glyphosate) and flanked at the 3' end by a polyA fragment to stabilize the transcript. The coding sequence for G-(VPGVG)$_{19}$-VPGV (SEQ ID NO:31) (the 20mer) fused with the gst coding sequence is inserted at the BglII site in pHD203-GUS-EPSPS-(EN/polyA) using adaptors or by filling in the recessed 3' end termini using Klenow fragment of E. coli DNA polymerase I. Stable expression is achieved by bombardiing the EPSPS vector containing gst-EG20mer coding sequences into cultured tobacco cells and growing them in the presence of glyphosate. The coding sequences are inserted into the region between rbcL and ORF 52 of the tobacco chloroplast genome in order to accomplish a high frequency of transformation (Svab and Maliga, (1993) Proc. Natl. Acad. Sci. USA 90 913–917).

Transgenic tobacco plants expressing polymers inside chloroplasts are obtained by bombarding leaves from aseptically grown plants with chloroplast vectors. Calli formed on selection media are regenerated. Optimal conditions for selection and regeneration of tobacco chloroplast transgenic plants is known in the art (Svab et al., (1990) Proc. Natl. Acad. Sci USA 87: 8526–8530; Staub and Maliga, (1992) The Plant Cell 4: 39–45; Svab and Maliga (1993) Proc. Natl. Acad. Sci. USA 90: 913–917.

Molecular and Biochemical Analyses of Chloroplast Transformants

Chloroplast DNA is isolated from transgenic plants by methods known in the art. Ethidium bromide stained gels of restriction digested ctDNA preparations are examined to detect additional ctDNA fragments; insertion of the EPSPS/gst-EG20mer fragment from chloroplast vectors into tobacco ct genomes introduce additional restriction sites into ct genomes of transgenic plants. ctDNA is digested with restriction enzyme and separated by electrophoresis on agarose gels and blotted onto nylon membranes. Fragments containing EPSPS or gst or polymer coding sequences are used as hybridization probes. All transgenic lines are tested for the presence of EPSPS-gst-polymer coding sequences in tobacco chloroplast genomes. Chloroplast extracts are prepared and protein purified as described in Example 3.

Example 6

Stable Nuclear Expression of Protein-Based Polymers in Transgenic Tobacco

The synthetic gst-G-(VPGVG)$_{19}$-VPGV (SEQ ID NO:31) gene cassette (Mc Pherson et al.) is inserted into a pKYLX vector (Schardl et al., (1987) Gene 61: 1–11) as follows. The MaeI/EcoR1 fragment containing the cassette is modified to incorporate a new ATG codon through addition to a Xhol/Ncol adapter (5'-TCGAGCCATGG-373'-CGGTACC-5') (SEQ ID NO:18 and 19 to the 5' end and moved into pKLYX7.1 as a Xhol/EcoR1 fragment. pKLYX7.2, a derivative of pKYLX7.1 (Daniell et al. (1986) Proc Natl. Acad Sci. USA 83: 248–255) wherein the Xbal site has been replaced with an EcoRl site is employed to receive the get-G-(VPGvG)$_{19}$-VPGV cassette.

Young, fully expanded tobacco leaves (*Nicotiana tabacum cv KY* 14) are taken from 8-week-old plants and surface sterilized for 10 min with 10% chlorox, followed by 3 min in 70% alcohol and washed 3 times with sterile distilled water. *Agrobactenum tumefaciens*-mediated leaf disk transformation and shoot regenerations are performed as described by Horsch et al. (1985) Science 227: 1229–1231). Briefly, putative transformants are selected on MS media containing 300 mg/L kanamycin and 500 mg/L mefoxin as described by Svab et al. (Proc. Natl. Acad. Sci. USA (1990) 87: 8526–8530). Kanamycin resistant shoots are transferred to rooting media. Approximately 50 kanamycin-resistant plantlets are selected for analysis. Control plants are transformed with pKYLX7.2 alone.

Putative transformants are verified by Southern hybridization and assayed for NPTII phosphotransferase activity as well as for production of the gst-G-(VPGVG)$_{19}$-VPGV protein (SEQ ID NO:31) (McPherson et al.). Selected individual transformants are selected to produce a homozygotic individual that is used as an initial progenitor for seeds to be used in field studies. Approximately 1 acre is planted with each type of transgenic tobacco. Smaller plots of vector-only transformed plants and nontransformed plants serve as controls for growth comparison or other assessments. Seedlings are greenhouse propagated and transplants are planted in research plots. Cell extracts are prepared (Scopes et al.) and polymers purified as described in Example 1.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A method for increasing the elasticity of a food product, comprising the step of incorporating in said food product or a precursor of said food product a synthetic bioelastic polypeptide in an amount sufficient to increase the elasticity of said food product, wherein said bioelastic polypeptide comprises tetrapeptide, pentapeptide, or nonapeptide repeating units or mixtures thereof and said repeating units exist in a conformation having a β-turn.

2. The method of claim 1, wherein said incorporating step comprises adding the bioelastic polypeptide to said precursor during the manufacture of said food product.

3. The method of claim 1, wherein said bioelastic polypeptide is a recombinant protein.

4. The method of claim 3, wherein said recombinant protein further comprises a glutenin.

5. The method of claim 3, wherein said incorporating step comprises expressing the recombinant protein in a host selected for processing into said food product.

6. The method of claim 5, wherein said host is selected from the group consisting of wheat, corn, oats, rye, millet and beans.

7. The method of claim 1, wherein said nonapeptide repeating units contain two proline residues, and at least three amino acid residues separate said proline residues.

8. The method of claim 1, wherein said pentapeptide repeating units contain a proline residue followed by a glycine or alanine residue; and said tetrapeptide and nonapeptide repeating units contain a proline followed by a glycine residue.

9. The method of claim 1, wherein said repeating unit is VPGVG (SEQ ID NO:20), IPGVG (SEQ ID NO:11) or VPAVG (SEQ ID NO:12).

10. The method of claim 1, wherein said food product precursor is a flour.

11. The method of claim 1, wherein said bioelastic polypeptide is present at about 10% w/w of said food product.

12. A method for binding a food product precursor comprising adding a bioelastic polypeptide in an amount sufficient to bind said food product precursor, wherein said bioelastic polypeptide comprises nonapeptide, tetrapeptide or pentapeptide repeating units or mixtures thereof and said repeating units exist in a conformation having a β-turn.

13. The method of claim 12, wherein said nonapeptide repeating units contain two proline residues, and at least three amino acid residues separate said proline residues.

14. The method of claim 12, wherein said pentapeptide repeating units contain a proline residue followed by a glycine or alanine residue; and said tetrapeptide and nonapeptide repeating units contain a proline followed by a glycine residue.

15. The method of claim 12, wherein said bioelastic polypeptide is present from about 1% to 99.5% w/w of said food product precursor.

16. A food adjunct, comprising a synthetic bioelastic polypeptide comprising nonapeptide, tetrapeptide or pentapeptide repeating units or mixtures thereof wherein said repeating units exist in a conformation having a β-turn, and an edible material suitable for human or animal consumption.

17. The food adjunct of claim 16, wherein said food adjunct is used as a foam.

18. The food adjunct of claim 16, wherein said food adjunct is a malleable material.

19. The food adjunct of claim 16, wherein said food adjunct is a gel.

20. The food adjunct of claim 16, wherein said food adjunct is a sheet.

21. The food adjunct of claim 16, wherein said bioelastic polypeptide is cross-linked.

22. The food adjunct of claim 16, wherein said bioelastic polypeptide is uncrosslinked.

23. The food adjunct of claim 16, wherein said bioelastic polypeptide further comprises a hexapeptide repeating unit.

24. The food adjunct of claim 23, wherein said bioelastic polypeptide comprises (GVGVP) (SEQ ID NO:3), (GVGIP) (SEQ ID NO:24) and (GFGVGP) (SEQ ID NO:13) repeating units.

25. The food adjunct of claim 16, wherein said edible material is selected from the group consisting of saccharin, sugar, peppermint and aspartame.

26. The food adjunct of claim 16, wherein said nonapeptide repeating units contain two proline residues, and at least three amino acid residues separate said proline residues.

27. The food adjunct of claim 16, wherein said pentapeptide repeating units contain a proline residue followed by a glycine or alanine residue; and said tetrapeptide and nonapeptide repeating units contain a proline followed by a glycine residue.

28. The food adjunct of claim 16, wherein said pentapeptide repeating unit is GVGIP (SEQ ID NO:24).

29. A method for improving the nutritional value of a food by supplanting and replacing the undesired properties of fats, comprising providing a synthetic bioelastic polypeptide in a food product, said bioelastic polypeptide comprising tetrapeptide, pentapeptide, or nonapeptide repeating units or mixtures thereof and said repeating units existing in a conformation having a β-turn.

* * * * *

SEQUENCE LISTING

<160> NUMBER OF SEQ ID NOS: 31

<210> SEQ ID NO 1
<211> LENGTH: 7
<212> TYPE: PRT
<213> ORGANISM: Artificial Sequence
<220> FEATURE:
<223> OTHER INFORMATION: Description of Artificial Sequence:synthetic

<400> SEQUENCE: 1

Gly Tyr Tyr Pro Thr Ser Pro
 1               5

<210> SEQ ID NO 2
<211> LENGTH: 6
<212> TYPE: PRT
<213> ORGANISM: Artificial Sequence
<220> FEATURE:
<223> OTHER INFORMATION: Description of Artificial Sequence:synthetic

<400> SEQUENCE: 2

Pro Gly Gln Gly Gln Gln
 1               5

<210> SEQ ID NO 3
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 3

Gly Val Gly Val Pro
 1               5

<210> SEQ ID NO 4
<211> LENGTH: 18
<212> TYPE: DNA
<213> ORGANISM: Artificial Sequence
<220> FEATURE:
<223> OTHER INFORMATION: Description of Artificial Sequence:synthetic

<400> SEQUENCE: 4
cgggatccag gcgttggt                                                   18

<210> SEQ ID NO 5
<211> LENGTH: 17
<212> TYPE: DNA
<213> ORGANISM: Artificial Sequence
<220> FEATURE:
<223> OTHER INFORMATION: Description of Artificial Sequence:synthetic

<400> SEQUENCE: 5
ccaggcgttg gatcccg                                                    17

<210> SEQ ID NO 6
<211> LENGTH: 22
<212> TYPE: DNA
<213> ORGANISM: Artificial Sequence
<220> FEATURE:
<223> OTHER INFORMATION: Description of Artificial Sequence:synthetic

<400> SEQUENCE: 6
tcggatccag accatgggcg tt                                              22

```
<210> SEQ ID NO 7
<211> LENGTH: 36
<212> TYPE: DNA
<213> ORGANISM: Artificial Sequence
<220> FEATURE:
<223> OTHER INFORMATION: Description of Artificial Sequence:synthetic

<400> SEQUENCE: 7
ggcgttggtg taccgtaagc ttgaattcgg atccag                                36

<210> SEQ ID NO 8
<211> LENGTH: 173
<212> TYPE: DNA
<213> ORGANISM: Artificial Sequence
<220> FEATURE:
<223> OTHER INFORMATION: Description of Artificial Sequence:synthetic

<400> SEQUENCE: 8
cgggatccag gagttggagt tcctggtgta ggtgtacctg gagttggtgt acctggtgta       60
ggagttcctg gagttggtgt tccaggtgta ggggtacctg gtgttggtgt tcctggagta     120
ggagtacctg gtgttggagt acccggggta ggtgttccag gagttggatc cg             173

<210> SEQ ID NO 9
<211> LENGTH: 4
<212> TYPE: PRT
<213> ORGANISM: Artificial Sequence
<220> FEATURE:
<223> OTHER INFORMATION: Description of Artificial Sequence:synthetic

<400> SEQUENCE: 9

Val Pro Gly Gly
  1

<210> SEQ ID NO 10
<211> LENGTH: 5
<212> TYPE: PRT
<213> ORGANISM: Artificial Sequence
<220> FEATURE:
<223> OTHER INFORMATION: Description of Artificial Sequence:synthetic
<220> FEATURE:
<221> NAME/KEY: VARIANT
<222> LOCATION: (1)..(5)
<223> OTHER INFORMATION: residue at position 4 can vary and can be any
      amino acid residue

<400> SEQUENCE: 10

Val Pro Gly Xaa Gly
  1               5

<210> SEQ ID NO 11
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 11

Ile Pro Gly Val Gly
  1               5

<210> SEQ ID NO 12
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 12
```

Val Pro Ala Val Gly
 1               5

<210> SEQ ID NO 13
<211> LENGTH: 6
<212> TYPE: PRT
<213> ORGANISM: Artificial Sequence
<220> FEATURE:
<223> OTHER INFORMATION: Description of Artificial Sequence:synthetic

<400> SEQUENCE: 13

Gly Phe Gly Val Gly Pro
 1               5

<210> SEQ ID NO 14
<211> LENGTH: 11
<212> TYPE: DNA
<213> ORGANISM: Artificial Sequence
<220> FEATURE:
<223> OTHER INFORMATION: Description of Artificial Sequence:synthetic

<400> SEQUENCE: 14
ccaggcgttg g                                                          11

<210> SEQ ID NO 15
<211> LENGTH: 15
<212> TYPE: PRT
<213> ORGANISM: Artificial Sequence
<220> FEATURE:
<223> OTHER INFORMATION: Description of Artificial Sequence:synthetic

<400> SEQUENCE: 15

Met Arg Gly Ser His Gly Ile Gln Thr Met Gly Val Gly Val Pro
 1               5                  10                  15

<210> SEQ ID NO 16
<211> LENGTH: 15
<212> TYPE: DNA
<213> ORGANISM: Artificial Sequence
<220> FEATURE:
<223> OTHER INFORMATION: Description of Artificial Sequence:synthetic
<220> FEATURE:
<221> NAME/KEY: variation
<222> LOCATION: (1)..(15)
<223> OTHER INFORMATION: nucleotides at positions 3, 6, 9, 12 and 15 can
      vary and can be g, a, t or c

<400> SEQUENCE: 16
ccngcngtng gngtn                                                      15

<210> SEQ ID NO 17
<211> LENGTH: 15
<212> TYPE: DNA
<213> ORGANISM: Artificial Sequence
<220> FEATURE:
<223> OTHER INFORMATION: Description of Artificial Sequence:synthetic
<220> FEATURE:
<221> NAME/KEY: variation
<222> LOCATION: (1)..(15)
<223> OTHER INFORMATION: nucleotides at positions 2, 5, 8, 11 and 14 can
      vary and can be g, a, t or c

<400> SEQUENCE: 17
cnggnacncc nacng                                                      15

<210> SEQ ID NO 18
<211> LENGTH: 11
<212> TYPE: DNA

<213> ORGANISM: Artificial Sequence
<220> FEATURE:
<223> OTHER INFORMATION: Description of Artificial Sequence:synthetic

<400> SEQUENCE: 18
tcgagccatg g                                                                                11

<210> SEQ ID NO 19
<211> LENGTH: 7
<212> TYPE: DNA
<213> ORGANISM: Artificial Sequence
<220> FEATURE:
<223> OTHER INFORMATION: Description of Artificial Sequence:synthetic

<400> SEQUENCE: 19 cggtacc                                                                                     7

<210> SEQ ID NO 20
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 20

Val Pro Gly Val Gly
 1               5

<210> SEQ ID NO 21
<211> LENGTH: 100
<212> TYPE: PRT
<213> ORGANISM: Artificial Sequence
<220> FEATURE:
<223> OTHER INFORMATION: Description of Artificial Sequence:synthetic

<400> SEQUENCE: 21

Gly Val Pro Gly Val Gly Val Pro Gly Val Gly Val Pro Gly Val Gly
 1               5                  10                  15

Val Pro Gly Val Gly Val Pro Gly Val Gly Val Pro Gly Val Gly Val
            20                  25                  30

Pro Gly Val Gly Val Pro Gly Val Gly Val Pro Gly Val Gly Val Pro
        35                  40                  45

Gly Val Gly Val Pro Gly Val Gly Val Pro Gly Val Gly Val Pro Gly
     50                  55                  60

Val Gly Val Pro Gly Val Gly Val Pro Gly Val Gly Val Pro Gly Val
 65                  70                  75                  80

Gly Val Pro Gly Val Gly Val Pro Gly Val Gly Val Pro Gly Val Gly
                 85                  90                  95

Val Pro Gly Val
            100

<210> SEQ ID NO 22
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 22

Gly Val Pro Gly Val
 1               5

<210> SEQ ID NO 23
<211> LENGTH: 5

```
<212> TYPE: PRT
<213> ORGANISM: Artificial Sequence
<220> FEATURE:
<223> OTHER INFORMATION: Description of Artificial Sequence:synthetic

<400> SEQUENCE: 23

Gly Val Pro Val Gly
 1               5

<210> SEQ ID NO 24
<211> LENGTH: 5
<212> TYPE: PRT
<213> ORGANISM: Artificial Sequence
<220> FEATURE:
<223> OTHER INFORMATION: Description of Artificial Sequence:synthetic

<400> SEQUENCE: 24

Gly Val Gly Ile Pro
 1               5

<210> SEQ ID NO 25
<211> LENGTH: 5
<212> TYPE: DNA
<213> ORGANISM: Artificial Sequence
<220> FEATURE:
<223> OTHER INFORMATION: Description of Artificial Sequence:synthetic

<400> SEQUENCE: 25 gatcc                                                              5

<210> SEQ ID NO 26
<211> LENGTH: 50
<212> TYPE: PRT
<213> ORGANISM: Artificial Sequence
<220> FEATURE:
<223> OTHER INFORMATION: Description of Artificial Sequence:synthetic

<400> SEQUENCE: 26

Gly Val Gly Val Pro Gly Val Gly Val Pro Gly Val Gly Val Pro Gly
 1               5                  10                  15
Val Gly Val Pro Gly Val Gly Val Pro Gly Val Gly Val Pro Gly Val
                20                  25                  30
Gly Val Pro Gly Val Gly Val Pro Gly Val Gly Val Pro Gly Val Gly
            35                  40                  45
Val Pro
    50

<210> SEQ ID NO 27
<211> LENGTH: 600
<212> TYPE: PRT
<213> ORGANISM: Artificial Sequence
<220> FEATURE:
<223> OTHER INFORMATION: Description of Artificial Sequence:synthetic

<400> SEQUENCE: 27

Gly Val Gly Val Pro Gly Val Gly Val Pro Gly Val Gly Val Pro Gly
 1               5                  10                  15

Val Gly Val Pro Gly Val Gly Val Pro Gly Val Gly Val Pro Gly Val
                20                  25                  30

Gly Val Pro Gly Val Gly Val Pro Gly Val Gly Val Pro Gly Val Gly
            35                  40                  45

Val Pro Gly Val Gly Val Pro Gly Val Gly Val Pro Gly Val Gly Val
        50                  55                  60

Pro Gly Val Gly Val Pro Gly Val Gly Val Pro Gly Val Gly Val Pro
65                  70                  75                  80

Gly Val Gly Val Pro Gly Val Gly Val Pro Gly Val Gly Val Pro Gly
```

-continued

```
                 85                  90                  95
Val Gly Val Pro Gly Val Gly Val Pro Gly Val Gly Val Pro Gly Val
                100                 105                 110
Gly Val Pro Gly Val Gly Val Pro Gly Val Gly Val Pro Gly Val Gly
                115                 120                 125
Val Pro Gly Val Gly Val Pro Gly Val Gly Val Pro Gly Val Gly Val
                130                 135                 140
Pro Gly Val Gly Val Pro Gly Val Gly Val Pro Gly Val Gly Val Pro
145                 150                 155                 160
Gly Val Gly Val Pro Gly Val Gly Val Pro Gly Val Gly Val Pro Gly
                165                 170                 175
Val Gly Val Pro Gly Val Gly Val Pro Gly Val Gly Val Pro Gly Val
                180                 185                 190
Gly Val Pro Gly Val Gly Val Pro Gly Val Gly Val Pro Gly Val Gly
                195                 200                 205
Val Pro Gly Val Gly Val Pro Gly Val Gly Val Pro Gly Val Gly Val
                210                 215                 220
Pro Gly Val Gly Val Pro Gly Val Gly Val Pro Gly Val Gly Val Pro
225                 230                 235                 240
Gly Val Gly Val Pro Gly Val Gly Val Pro Gly Val Gly Val Pro Gly
                245                 250                 255
Val Gly Val Pro Gly Val Gly Val Pro Gly Val Gly Val Pro Gly Val
                260                 265                 270
Gly Val Pro Gly Val Gly Val Pro Gly Val Gly Val Pro Gly Val Gly
                275                 280                 285
Val Pro Gly Val Gly Val Pro Gly Val Gly Val Pro Gly Val Gly Val
                290                 295                 300
Pro Gly Val Gly Val Pro Gly Val Gly Val Pro Gly Val Gly Val Pro
305                 310                 315                 320
Gly Val Gly Val Pro Gly Val Gly Val Pro Gly Val Gly Val Pro Gly
                325                 330                 335
Val Gly Val Pro Gly Val Gly Val Pro Gly Val Gly Val Pro Gly Val
                340                 345                 350
Gly Val Pro Gly Val Gly Val Pro Gly Val Gly Val Pro Gly Val Gly
                355                 360                 365
Val Pro Gly Val Gly Val Pro Gly Val Gly Val Pro Gly Val Gly Val
                370                 375                 380
Pro Gly Val Gly Val Pro Gly Val Gly Val Pro Gly Val Gly Val Pro
385                 390                 395                 400
Gly Val Gly Val Pro Gly Val Gly Val Pro Gly Val Gly Val Pro Gly
                405                 410                 415
Val Gly Val Pro Gly Val Gly Val Pro Gly Val Gly Val Pro Gly Val
                420                 425                 430
Gly Val Pro Gly Val Gly Val Pro Gly Val Gly Val Pro Gly Val Gly
                435                 440                 445
Val Pro Gly Val Gly Val Pro Gly Val Gly Val Pro Gly Val Gly Val
                450                 455                 460
Pro Gly Val Gly Val Pro Gly Val Gly Val Pro Gly Val Gly Val Pro
465                 470                 475                 480
Gly Val Gly Val Pro Gly Val Gly Val Pro Gly Val Gly Val Pro Gly
                485                 490                 495
Val Gly Val Pro Gly Val Gly Val Pro Gly Val Gly Val Pro Gly Val
                500                 505                 510
```

-continued

Gly Val Pro Gly Val Gly Val Pro Gly Val Gly Val Pro Gly Val Gly
                515                 520                 525

Val Pro Gly Val Gly Val Pro Gly Val Gly Val Pro Gly Val Gly Val
            530                 535                 540

Pro Gly Val Gly Val Pro Gly Val Gly Val Pro Gly Val Gly Val Pro
545                 550                 555                 560

Gly Val Gly Val Pro Gly Val Gly Val Pro Gly Val Gly Val Pro Gly
                565                 570                 575

Val Gly Val Pro Gly Val Gly Val Pro Gly Val Gly Val Pro Gly Val
            580                 585                 590

Gly Val Pro Gly Val Gly Val Pro
        595                 600

<210> SEQ ID NO 28
<211> LENGTH: 1250
<212> TYPE: PRT
<213> ORGANISM: Artificial Sequence
<220> FEATURE:
<223> OTHER INFORMATION: Description of Artificial Sequence:synthetic

<400> SEQUENCE: 28

Gly Val Gly Val Pro Gly Val Gly Val Pro Gly Val Gly Val Pro Gly
 1               5                  10                  15

Val Gly Val Pro Gly Val Gly Val Pro Gly Val Gly Val Pro Gly Val
             20                  25                  30

Gly Val Pro Gly Val Gly Val Pro Gly Val Gly Val Pro Gly Val Gly
         35                  40                  45

Val Pro Gly Val Gly Val Pro Gly Val Gly Val Pro Gly Val Gly Val
     50                  55                  60

Pro Gly Val Gly Val Pro Gly Val Gly Val Pro Gly Val Gly Val Pro
65                  70                  75                  80

Gly Val Gly Val Pro Gly Val Gly Val Pro Gly Val Gly Val Pro Gly
                85                  90                  95

Val Gly Val Pro Gly Val Gly Val Pro Gly Val Gly Val Pro Gly Val
            100                 105                 110

Gly Val Pro Gly Val Gly Val Pro Gly Val Gly Val Pro Gly Val Gly
        115                 120                 125

Val Pro Gly Val Gly Val Pro Gly Val Gly Val Pro Gly Val Gly Val
    130                 135                 140

Pro Gly Val Gly Val Pro Gly Val Gly Val Pro Gly Val Gly Val Pro
145                 150                 155                 160

Gly Val Gly Val Pro Gly Val Gly Val Pro Gly Val Gly Val Pro Gly
                165                 170                 175

Val Gly Val Pro Gly Val Gly Val Pro Gly Val Gly Val Pro Gly Val
            180                 185                 190

Gly Val Pro Gly Val Gly Val Pro Gly Val Gly Val Pro Gly Val Gly
        195                 200                 205

Val Pro Gly Val Gly Val Pro Gly Val Gly Val Pro Gly Val Gly Val
    210                 215                 220

Pro Gly Val Gly Val Pro Gly Val Gly Val Pro Gly Val Gly Val Pro
225                 230                 235                 240

Gly Val Gly Val Pro Gly Val Gly Val Pro Gly Val Gly Val Pro Gly
                245                 250                 255

Val Gly Val Pro Gly Val Gly Val Pro Gly Val Gly Val Pro Gly Val
            260                 265                 270

Gly Val Pro Gly Val Gly Val Pro Gly Val Gly Val Pro Gly Val Gly

-continued

```
                    275                 280                 285
Val Pro Gly Val Gly Val Pro Gly Val Gly Val Pro Gly Val Gly Val
    290                 295                 300
Pro Gly Val Gly Val Pro Gly Val Gly Val Pro Gly Val Gly Val Pro
305                 310                 315                 320
Gly Val Gly Val Pro Gly Val Gly Val Pro Gly Val Gly Val Pro Gly
                325                 330                 335
Val Gly Val Pro Gly Val Gly Val Pro Gly Val Gly Val Pro Gly Val
            340                 345                 350
Gly Val Pro Gly Val Gly Val Pro Gly Val Gly Val Pro Gly Val Gly
        355                 360                 365
Val Pro Gly Val Gly Val Pro Gly Val Gly Val Pro Gly Val Gly Val
    370                 375                 380
Pro Gly Val Gly Val Pro Gly Val Gly Val Pro Gly Val Gly Val Pro
385                 390                 395                 400
Gly Val Gly Val Pro Gly Val Gly Val Pro Gly Val Gly Val Pro Gly
                405                 410                 415
Val Gly Val Pro Gly Val Gly Val Pro Gly Val Gly Val Pro Gly Val
            420                 425                 430
Gly Val Pro Gly Val Gly Val Pro Gly Val Gly Val Pro Gly Val Gly
        435                 440                 445
Val Pro Gly Val Gly Val Pro Gly Val Gly Val Pro Gly Val Gly Val
    450                 455                 460
Pro Gly Val Gly Val Pro Gly Val Gly Val Pro Gly Val Gly Val Pro
465                 470                 475                 480
Gly Val Gly Val Pro Gly Val Gly Val Pro Gly Val Gly Val Pro Gly
                485                 490                 495
Val Gly Val Pro Gly Val Gly Val Pro Gly Val Gly Val Pro Gly Val
            500                 505                 510
Gly Val Pro Gly Val Gly Val Pro Gly Val Gly Val Pro Gly Val Gly
        515                 520                 525
Val Pro Gly Val Gly Val Pro Gly Val Gly Val Pro Gly Val Gly Val
    530                 535                 540
Pro Gly Val Gly Val Pro Gly Val Gly Val Pro Gly Val Gly Val Pro
545                 550                 555                 560
Gly Val Gly Val Pro Gly Val Gly Val Pro Gly Val Gly Val Pro Gly
                565                 570                 575
Val Gly Val Pro Gly Val Gly Val Pro Gly Val Gly Val Pro Gly Val
            580                 585                 590
Gly Val Pro Gly Val Gly Val Pro Gly Val Gly Val Pro Gly Val Gly
        595                 600                 605
Val Pro Gly Val Gly Val Pro Gly Val Gly Val Pro Gly Val Gly Val
    610                 615                 620
Pro Gly Val Gly Val Pro Gly Val Gly Val Pro Gly Val Gly Val Pro
625                 630                 635                 640
Gly Val Gly Val Pro Gly Val Gly Val Pro Gly Val Gly Val Pro Gly
                645                 650                 655
Val Gly Val Pro Gly Val Gly Val Pro Gly Val Gly Val Pro Gly Val
            660                 665                 670
Gly Val Pro Gly Val Gly Val Pro Gly Val Gly Val Pro Gly Val Gly
        675                 680                 685
Val Pro Gly Val Gly Val Pro Gly Val Gly Val Pro Gly Val Gly Val
    690                 695                 700
```

-continued

```
Pro Gly Val Gly Val Pro Gly Val Gly Val Pro Gly Val Gly Val Pro
705                 710                 715                 720
Gly Val Gly Val Pro Gly Val Gly Val Pro Gly Val Gly Val Pro Gly
                725                 730                 735
Val Gly Val Pro Gly Val Gly Val Pro Gly Val Gly Val Pro Gly Val
            740                 745                 750
Gly Val Pro Gly Val Gly Val Pro Gly Val Gly Val Pro Gly Val Gly
        755                 760                 765
Val Pro Gly Val Gly Val Pro Gly Val Gly Val Pro Gly Val Gly Val
770                 775                 780
Pro Gly Val Gly Val Pro Gly Val Gly Val Pro Gly Val Gly Val Pro
785                 790                 795                 800
Gly Val Gly Val Pro Gly Val Gly Val Pro Gly Val Gly Val Pro Gly
                805                 810                 815
Val Gly Val Pro Gly Val Gly Val Pro Gly Val Gly Val Pro Gly Val
            820                 825                 830
Gly Val Pro Gly Val Gly Val Pro Gly Val Gly Val Pro Gly Val Gly
        835                 840                 845
Val Pro Gly Val Gly Val Pro Gly Val Gly Val Pro Gly Val Gly Val
850                 855                 860
Pro Gly Val Gly Val Pro Gly Val Gly Val Pro Gly Val Gly Val Pro
865                 870                 875                 880
Gly Val Gly Val Pro Gly Val Gly Val Pro Gly Val Gly Val Pro Gly
                885                 890                 895
Val Gly Val Pro Gly Val Gly Val Pro Gly Val Gly Val Pro Gly Val
            900                 905                 910
Gly Val Pro Gly Val Gly Val Pro Gly Val Gly Val Pro Gly Val Gly
        915                 920                 925
Val Pro Gly Val Gly Val Pro Gly Val Gly Val Pro Gly Val Gly Val
930                 935                 940
Pro Gly Val Gly Val Pro Gly Val Gly Val Pro Gly Val Gly Val Pro
945                 950                 955                 960
Gly Val Gly Val Pro Gly Val Gly Val Pro Gly Val Gly Val Pro Gly
                965                 970                 975
Val Gly Val Pro Gly Val Gly Val Pro Gly Val Gly Val Pro Gly Val
            980                 985                 990
Gly Val Pro Gly Val Gly Val Pro Gly Val Gly Val Pro Gly Val Gly
        995                 1000                1005
Val Pro Gly Val Gly Val Pro Gly Val Gly Val Pro Gly Val Gly Val
1010                1015                1020
Pro Gly Val Gly Val Pro Gly Val Gly Val Pro Gly Val Gly Val Pro
1025                1030                1035                1040
Gly Val Gly Val Pro Gly Val Gly Val Pro Gly Val Gly Val Pro Gly
                1045                1050                1055
Val Gly Val Pro Gly Val Gly Val Pro Gly Val Gly Val Pro Gly Val
            1060                1065                1070
Gly Val Pro Gly Val Gly Val Pro Gly Val Gly Val Pro Gly Val Gly
        1075                1080                1085
Val Pro Gly Val Gly Val Pro Gly Val Gly Val Pro Gly Val Gly Val
1090                1095                1100
Pro Gly Val Gly Val Pro Gly Val Gly Val Pro Gly Val Gly Val Pro
1105                1110                1115                1120
Gly Val Gly Val Pro Gly Val Gly Val Pro Gly Val Gly Val Pro Gly
                1125                1130                1135
```

```
Val Gly Val Pro Gly Val Gly Val Pro Gly Val Gly Val Pro Gly Val
            1140                1145                1150

Gly Val Pro Gly Val Gly Val Pro Gly Val Gly Val Pro Gly Val Gly
            1155                1160                1165

Val Pro Gly Val Gly Val Pro Gly Val Gly Val Pro Gly Val Gly Val
    1170                1175                1180

Pro Gly Val Gly Val Pro Gly Val Gly Val Pro Gly Val Gly Val Pro
1185                1190                1195                1200

Gly Val Gly Val Pro Gly Val Gly Val Pro Gly Val Gly Val Pro Gly
            1205                1210                1215

Val Gly Val Pro Gly Val Gly Val Pro Gly Val Gly Val Pro Gly Val
            1220                1225                1230

Gly Val Pro Gly Val Gly Val Pro Gly Val Gly Val Pro Gly Val Gly
        1235                1240                1245

Val Pro
    1250

<210> SEQ ID NO 29
<211> LENGTH: 610
<212> TYPE: PRT
<213> ORGANISM: Artificial Sequence
<220> FEATURE:
<223> OTHER INFORMATION: Description of Artificial Sequence:synthetic

<400> SEQUENCE: 29

Met Arg Gly Ser His Gly Ile Gln Thr Met Gly Val Gly Val Pro Gly
1               5                   10                  15

Val Gly Val Pro Gly Val Gly Val Pro Gly Val Gly Val Pro Gly Val
            20                  25                  30

Gly Val Pro Gly Val Gly Val Pro Gly Val Gly Val Pro Gly Val Gly
        35                  40                  45

Val Pro Gly Val Gly Val Pro Gly Val Gly Val Pro Gly Val Gly Val
    50                  55                  60

Pro Gly Val Gly Val Pro Gly Val Gly Val Pro Gly Val Gly Val Pro
65                  70                  75                  80

Gly Val Gly Val Pro Gly Val Gly Val Pro Gly Val Gly Val Pro Gly
                85                  90                  95

Val Gly Val Pro Gly Val Gly Val Pro Gly Val Gly Val Pro Gly Val
            100                 105                 110

Gly Val Pro Gly Val Gly Val Pro Gly Val Gly Val Pro Gly Val Gly
        115                 120                 125

Val Pro Gly Val Gly Val Pro Gly Val Gly Val Pro Gly Val Gly Val
    130                 135                 140

Pro Gly Val Gly Val Pro Gly Val Gly Val Pro Gly Val Gly Val Pro
145                 150                 155                 160

Gly Val Gly Val Pro Gly Val Gly Val Pro Gly Val Gly Val Pro Gly
                165                 170                 175

Val Gly Val Pro Gly Val Gly Val Pro Gly Val Gly Val Pro Gly Val
            180                 185                 190

Gly Val Pro Gly Val Gly Val Pro Gly Val Gly Val Pro Gly Val Gly
        195                 200                 205

Val Pro Gly Val Gly Val Pro Gly Val Gly Val Pro Gly Val Gly Val
    210                 215                 220

Pro Gly Val Gly Val Pro Gly Val Gly Val Pro Gly Val Gly Val Pro
225                 230                 235                 240
```

Gly Val Gly Val Pro Gly Val Gly Val Pro Gly Val Gly Val Pro Gly
                245                 250                 255
Val Gly Val Pro Gly Val Gly Val Pro Gly Val Gly Val Pro Gly Val
            260                 265                 270
Gly Val Pro Gly Val Gly Val Pro Gly Val Gly Val Pro Gly Val Gly
        275                 280                 285
Val Pro Gly Val Gly Val Pro Gly Val Gly Val Pro Gly Val Gly Val
    290                 295                 300
Pro Gly Val Gly Val Pro Gly Val Gly Val Pro Gly Val Gly Val Pro
305                 310                 315                 320
Gly Val Gly Val Pro Gly Val Gly Val Pro Gly Val Gly Val Pro Gly
                325                 330                 335
Val Gly Val Pro Gly Val Gly Val Pro Gly Val Gly Val Pro Gly Val
            340                 345                 350
Gly Val Pro Gly Val Gly Val Pro Gly Val Gly Val Pro Gly Val Gly
        355                 360                 365
Val Pro Gly Val Gly Val Pro Gly Val Gly Val Pro Gly Val Gly Val
    370                 375                 380
Pro Gly Val Gly Val Pro Gly Val Gly Val Pro Gly Val Gly Val Pro
385                 390                 395                 400
Gly Val Gly Val Pro Gly Val Gly Val Pro Gly Val Gly Val Pro Gly
                405                 410                 415
Val Gly Val Pro Gly Val Gly Val Pro Gly Val Gly Val Pro Gly Val
            420                 425                 430
Gly Val Pro Gly Val Gly Val Pro Gly Val Gly Val Pro Gly Val Gly
        435                 440                 445
Val Pro Gly Val Gly Val Pro Gly Val Gly Val Pro Gly Val Gly Val
    450                 455                 460
Pro Gly Val Gly Val Pro Gly Val Gly Val Pro Gly Val Gly Val Pro
465                 470                 475                 480
Gly Val Gly Val Pro Gly Val Gly Val Pro Gly Val Gly Val Pro Gly
                485                 490                 495
Val Gly Val Pro Gly Val Gly Val Pro Gly Val Gly Val Pro Gly Val
            500                 505                 510
Gly Val Pro Gly Val Gly Val Pro Gly Val Gly Val Pro Gly Val Gly
        515                 520                 525
Val Pro Gly Val Gly Val Pro Gly Val Gly Val Pro Gly Val Gly Val
    530                 535                 540
Pro Gly Val Gly Val Pro Gly Val Gly Val Pro Gly Val Gly Val Pro
545                 550                 555                 560
Gly Val Gly Val Pro Gly Val Gly Val Pro Gly Val Gly Val Pro Gly
                565                 570                 575
Val Gly Val Pro Gly Val Gly Val Pro Gly Val Gly Val Pro Gly Val
            580                 585                 590
Gly Val Pro Gly Val Gly Val Pro Gly Val Gly Val Pro Gly Val Gly
        595                 600                 605
Val Pro
    610

SEQ ID NO 30
LENGTH: 5
TYPE: PRT
ORGANISM: Artificial Sequence
FEATURE:
OTHER INFORMATION: Description of Artificial Sequence:synthetic -continued

```
SEQUENCE: 30

Ala Val Gly Val Pro
 1               5

<210> SEQ ID NO 31
<211> LENGTH: 100
<212> TYPE: PRT
<213> ORGANISM: Artificial Sequence
<220> FEATURE:
<223> OTHER INFORMATION: Description of Artificial Sequence:synthetic

<400> SEQUENCE: 31

Gly Val Pro Gly Val Gly Val Pro Gly Val Gly Val Pro Gly Val Gly
 1               5                  10                  15

Val Pro Gly Val Gly Val Pro Gly Val Gly Val Pro Gly Val Gly Val
                20                  25                  30

Pro Gly Val Gly Val Pro Gly Val Gly Val Pro Gly Val Gly Val Pro
            35                  40                  45

Gly Val Gly Val Pro Gly Val Gly Val Pro Gly Val Gly Val Pro Gly
        50                  55                  60

Val Gly Val Pro Gly Val Gly Val Pro Gly Val Gly Val Pro Gly Val
65                  70                  75                  80

Gly Val Pro Gly Val Gly Val Pro Gly Val Gly Val Pro Gly Val Gly
                85                  90                  95

Val Pro Gly Val
            100
```